United States Patent
Dick

(10) Patent No.: US 6,918,329 B2
(45) Date of Patent: Jul. 19, 2005

(54) CARRIAGE COUPLING DEVICE

(75) Inventor: Spencer B. Dick, Portland, OR (US)

(73) Assignee: Precision Automation, Inc., Vancouver, WA (US)

( * ) Notice: Subject to any disclaimer, the term of this patent is extended or adjusted under 35 U.S.C. 154(b) by 0 days.

(21) Appl. No.: 10/642,351

(22) Filed: Aug. 15, 2003

(65) Prior Publication Data

US 2004/0123712 A1 Jul. 1, 2004

Related U.S. Application Data

(60) Provisional application No. 60/405,067, filed on Aug. 20, 2002, and provisional application No. 60/405,069, filed on Aug. 20, 2002.

(51) Int. Cl.[7] .............................................. B27B 27/02
(52) U.S. Cl. ........................ 83/440; 83/468.7; 83/477; 83/477.2
(58) Field of Search .......................... 83/440, 438, 477, 83/477.1, 477.2, 468.7

(56) References Cited

U.S. PATENT DOCUMENTS

| | | | |
|---|---|---|---|
| 2,577,766 | A | 12/1951 | Johnson et al. |
| 2,852,049 | A | 9/1958 | Peterson |
| 3,170,736 | A | 2/1965 | Wright |
| 3,566,239 | A | 2/1971 | Taniguchi |
| 3,584,284 | A | 6/1971 | Beach |
| 3,814,153 | A | 6/1974 | Schmidt |
| 3,854,889 | A | 12/1974 | Lemelson |
| 4,221,974 | A | 9/1980 | Mueller et al. |
| 4,260,001 | A | 4/1981 | De Muynck |
| 4,358,166 | A | 11/1982 | Antoine |
| 4,453,838 | A | 6/1984 | Loizeau |
| 4,472,783 | A | 9/1984 | Johnstone et al. |
| 4,725,961 | A | 2/1988 | Pearl |
| 4,874,996 | A | 10/1989 | Rosenthal |
| 4,878,524 | A | 11/1989 | Rosenthal et al. |
| 5,001,955 | A | 3/1991 | Fujiwara |
| 5,054,938 | A | 10/1991 | Ide |
| 5,197,172 | A | 3/1993 | Takagi et al. |
| 5,251,142 | A | 10/1993 | Cramer |
| 5,266,878 | A | 11/1993 | Makino et al. |
| 5,365,812 | A | 11/1994 | Harnden |
| 5,418,729 | A | 5/1995 | Holmes et al. |
| 5,444,635 | A | 8/1995 | Blaine et al. |
| 5,460,070 | A | 10/1995 | Buskness |
| 5,472,028 | A | 12/1995 | Faulhaber |
| 5,489,155 | A | 2/1996 | Ide |
| 5,524,514 | A | 6/1996 | Hadaway et al. |
| 5,664,888 | A | 9/1997 | Sabin |
| RE35,663 | E | 11/1997 | Mori et al. |
| 5,772,192 | A | 6/1998 | Hoffmann |
| 5,797,685 | A | 8/1998 | Jurik et al. |
| 5,798,929 | A | 8/1998 | Stenzel et al. |
| 5,829,892 | A | 11/1998 | Groves |
| 5,865,080 | A | 2/1999 | Jackson |
| 5,933,353 | A | 8/1999 | Abriam et al. |
| 5,938,344 | A | 8/1999 | Sabin |
| 5,953,232 | A | 9/1999 | Blaimschein |
| 5,964,536 | A | 10/1999 | Kinoshita |
| 6,144,895 | A | 11/2000 | Govindaraj et al. |
| 6,263,773 | B1 | 7/2001 | McAdoo et al. |
| 6,272,437 | B1 | 8/2001 | Woods et al. |
| 6,379,048 | B1 | 4/2002 | Brissette |
| 6,463,352 | B1 | 10/2002 | Tadokoro et al. |
| 6,470,377 | B1 | 10/2002 | Sevcik et al. |
| 6,510,361 | B1 | 1/2003 | Govindaraj et al. |
| 6,520,228 | B1 | 2/2003 | Kennedy et al. |
| 6,631,006 | B2 | 10/2003 | Dick et al. |
| 6,675,685 | B2 * | 1/2004 | Ceroll et al. .................. 83/438 |

* cited by examiner

Primary Examiner—Charles Goodman
(74) Attorney, Agent, or Firm—Kolisch Hartwell, P.C.

(57) ABSTRACT

A positioning carriage is coupled to a fence structure by a rigid sheet having one or more bends around an axis parallel to the direction of fence structure movement.

19 Claims, 3 Drawing Sheets

CARRIAGE COUPLING DEVICE

CROSS-REFERENCE TO RELATED APPLICATION

This application claims priority under 35 U.S.C. § 119 and applicable foreign and international law of U.S. Provisional Patent Applications Ser. Nos. 60/405,067 and 60/405,069 filed Aug. 20, 2002, each of which is hereby incorporated by reference in its entirety for all purposes.

This application incorporates by reference in its entirety the following U.S. patent applications and patents: U.S. patent application Ser. No. 09/578,806 filed May 24, 2000 entitled "Automated Fence Control Coupling System"; U.S. patent application Ser. No. 09/861,231 filed May 17, 2001 entitled "System and Method of Marking Materials for Automated Processing"; U.S. patent application Ser. No. 10/104,492 filed Mar. 22, 2002 entitled "Automated Fence Control Coupling System"; U.S. Provisional Patent Application Ser. No. 60/405,068 filed Aug. 20, 2002 entitled "Process Management System and Method"; and U.S. Pat. Nos. 491,307; 2,315,458; 2,731,989; 2,740,437; 2,852,049; 3,994,484; 4,111,088; 4,434,693; 4,658,687; 4,791,757; 4,805,505; 4,901,992; 5,251,142; 5,443,554; 5,444,635; 5,460,070; 5,524,514; and 6,216,574.

FIELD OF THE INVENTION

The invention relates to devices for controlling linear movement of an object such as a fence on a table saw. In particular, the invention involves an assembly for rigidly connecting a positioning carriage to a fence structure on a table saw.

BACKGROUND OF THE INVENTION

Significant effort and attention has been directed over the years at automating material handling and manufacturing. Ultimately, material processing equipment must be cost effective to manufacture and use. Therefore, innovation is needed to produce manufacturing equipment that is affordable, in view of its intended use, without sacrificing or compromising precision, accuracy, and overall functional performance.

Table saws may be equipped with a movable fence to allow an operator to set desired cut dimensions. Table saw fences typically are movable along a rail that is bolted along one side of the table saw. An operator may slide the fence back and forth along the rail and then lock the fence in place by means of a locking handle. Many such table saws are sold in a design that requires manual adjustment of the fence.

Sometimes it is desirable to use a table saw in an automated or semi-automated capacity. Digital positioning systems are available for adding on to a table saw that has a manually operable fence. Aftermarket automated fence positioning systems may be cumbersome to install. Some positioning systems are not flexible enough to be easily mounted on different table saw configurations. Thus, an object of the invention is to provide an automated fence positioning system that is easy to install and to adapt to different table saw designs.

Another object of the invention is to produce a table saw control system that is less expensive to produce compared to prior control systems, without compromising speed, precision, and specifications.

SUMMARY OF THE INVENTION

The invention provides automated fence positioning systems that quickly and accurately reposition a fence in the course of executing a pre-determined sequence of cuts on a table saw. An exemplary aspect of the invention utilizes a partially folded rigid sheet structure to connect a positioning carriage to a rip fence structure.

DESCRIPTIONS OF EXAMPLES OF THE INVENTION

One aspect of the invention involves an assembly for rigidly connecting a positioning carriage to a fence structure. For example, a partially folded sheet member connects a positioning carriage to a fence or associated support structure. A preferred example of a coupling device implemented on a rip saw is described below with reference to FIGS. 1–4.

Figure 1:
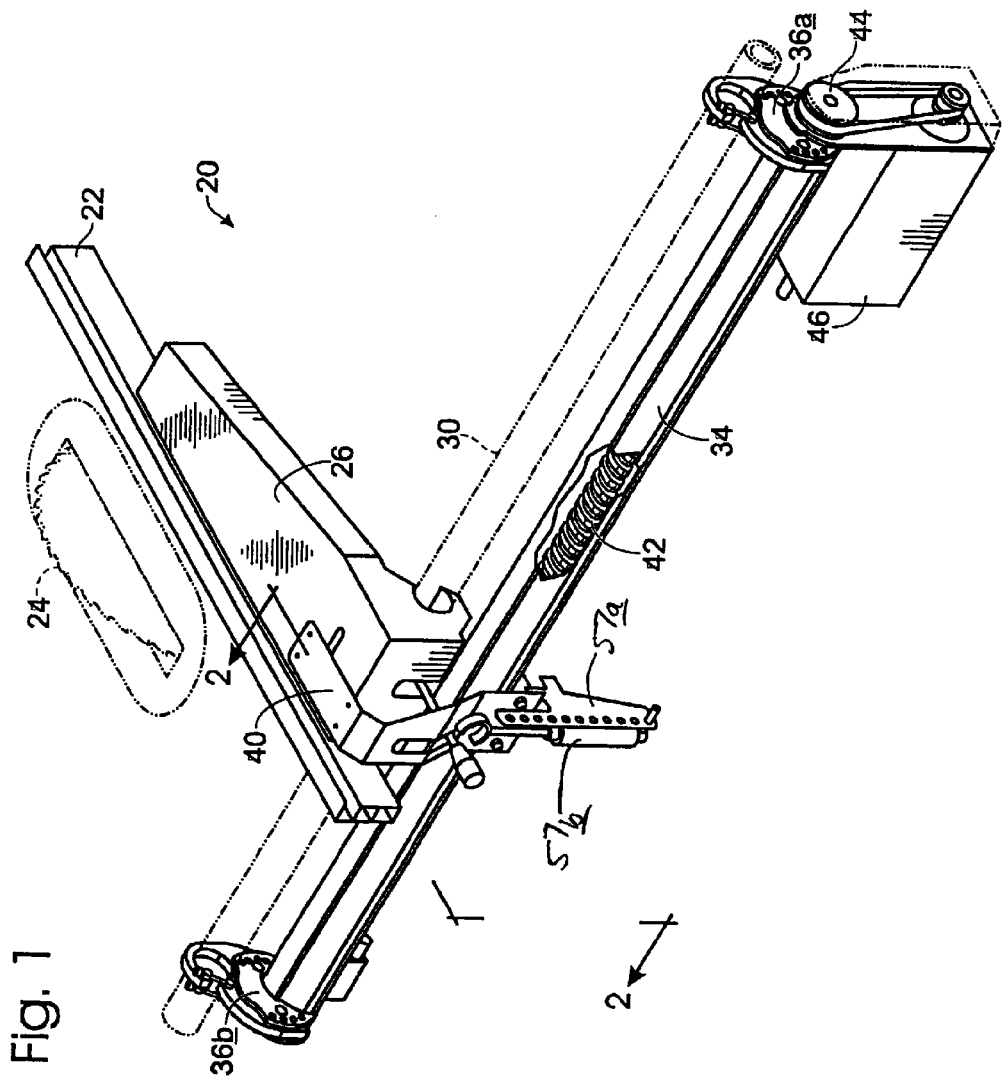
FIG. 1 is a perspective view of an automated fence positioning system.

FIG. 1 shows a perspective view of an exemplary fence control system 20. Fence 22 is provided on a table saw to index a piece of material for cutting relative to saw blade 24. Fence 22 is connected to fence support member 26 which is slidably connected to fence positioning rail 30. Fence positioning rail 30 is coupled to positioning guide rail 34 via clamps or linkage devices 36a and 36b. Carriage coupling device 40 rigidly connects fence support member 26 to a carriage (shown in FIGS. 2–4) which moves inside positioning guide rail 34. Screw member 42 is driven by belt and pulley assembly 44 and a motor inside housing 46 to move the carriage along with carriage coupling device 40, fence support member, and fence 22 to properly position materials for cutting.

Figure 2:
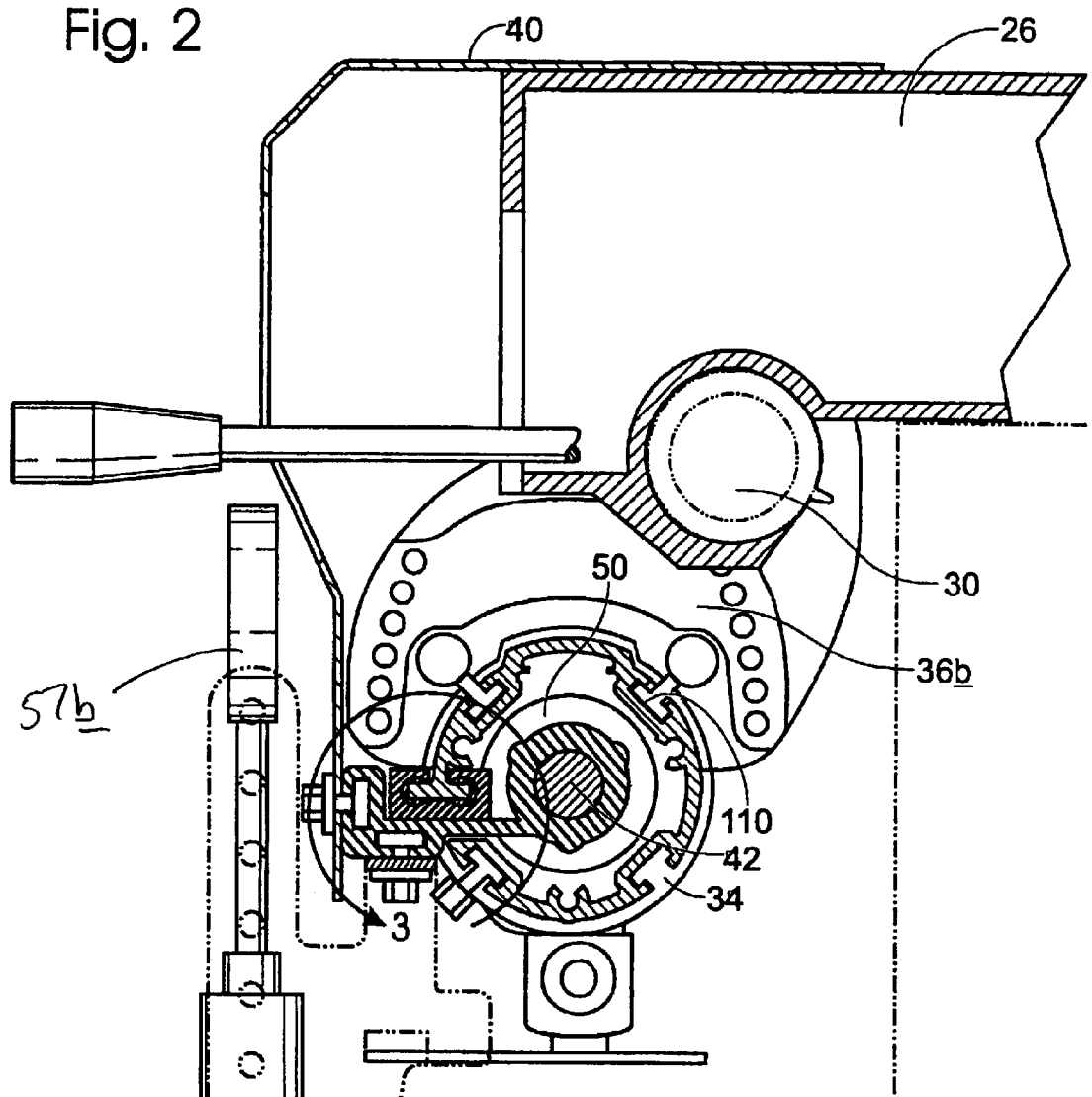
FIG. 2 is a partial cross-sectional view of the system shown in FIG. 1.
Figure 3:
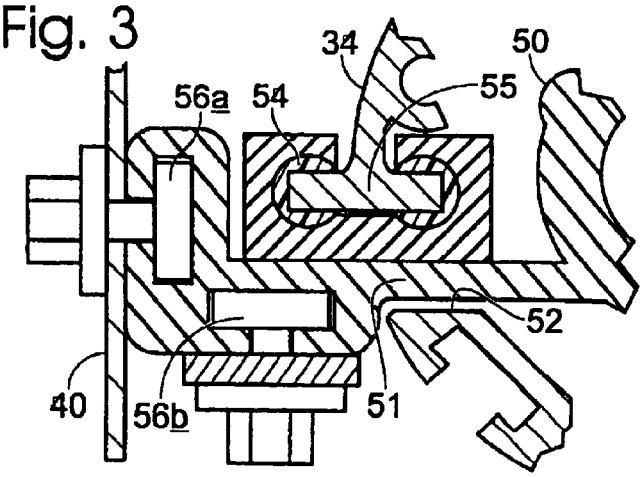
FIG. 3 is a close-up view of a coupling device shown in FIG. 2.

FIG. 2 is a cross-sectional view through the assembly of FIG. 1 showing the linkage between internal carriage 50 and carriage coupling device 40. A close-up view of the linkage is shown in FIG. 3. Carriage 50 has a cylindrical portion that has internal threads complimenting threads on screw shaft 42. The cylindrical portion of carriage 50 is contained entirely inside positioning guide rail 34. Carriage 50 also has a flange portion 51 that extends through slot 52, which runs substantially the entire length of positioning guide rail 34. Flange portion 51 includes three T-slots. One T-slot has anti-friction surface material 54 so that carriage 50 can move with a low coefficient of friction relative to T-structure 55 on positioning guide rail 34. Two other T-slots are provided. T-slot 56a receives one or more bolts for securing fence structure coupling device 40. T-slot 56b receives one or more bolts for securing interlock plate member 57a. Interlock device 57b is mounted on plate member 57a, and operates to prevent operation of the machine while the carriage is moving. The T-slot configuration shown in FIG. 3 provides a rigid, sturdy connection between carriage 50 and carriage coupling device 40, thus enabling carriage 50 to move smoothly on a single rail or guide structure 55 without contacting any other internal surface inside positioning guide rail 34. Therefore, the positioning system can operate with minimal friction making the device more efficient to operate and less expensive to produce compared to prior positioning systems. Alternative slot arrangements may be used. Other types of fastening devices, for example, bolts with nuts, soldered or welded connections, etc. may also be used.

Figure 4:
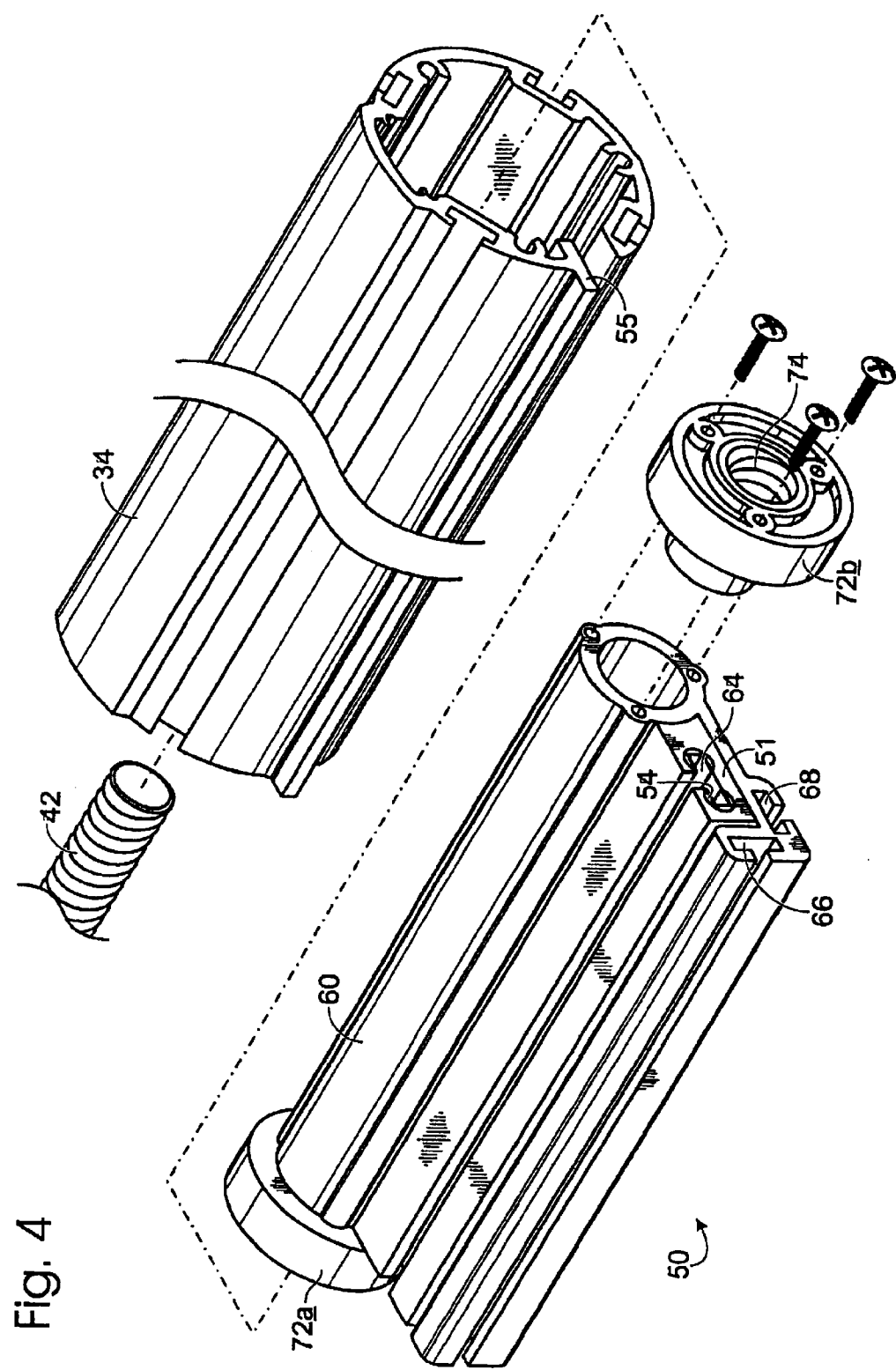
FIG. 4 is a partially exploded view of a rail section and a carriage device configured to move inside the rail.

In FIG. 4, a portion of positioning guide rail 34 receives carriage 50. Carriage 50 includes cylindrical portion 60 connected to flange portion 51. Flange portion 51 includes three T-slots 64, 66, and 68 for receiving T-structures or bolts, as discussed above and shown in FIG. 3. Collar members 72a and 72b are secured at opposite ends of carriage 50, and are provided with internal threads 74 complimenting external threads on screw 42.

The specific embodiments disclosed and illustrated herein should not be considered as limiting the scope of the invention. Numerous variations are possible without falling outside the scope of the appended claims. For example, the invention may be implemented in numerous different machine configurations with varying levels of automation. The invention may also be used to process many different kinds of materials including, but not limited to, wood, wood composites, polymeric materials such as PVC, polystyrene, polypropylene, polyethylene, fiberglass, textiles, etc. In addition to cutting, the invention may be used to carry out other processing steps such as bonding, sewing, heating, UV curing, painting or graphics application, etc. The subject matter of the invention includes all novel and nonobvious combinations and subcombinations of the various elements, features, functions, and/or properties disclosed herein.

I claim:

1. A linear positioning system for guiding a rip fence structure on a table saw comprising a rail assembly, a carriage configured to move back and forth alone the rail assembly, and a partially folded coupler sheet rigidly connecting the carriage to the fence structure, wherein the coupler has an opening through which a handle extends for manipulating an interlock that prevents simultaneous operation of the saw when the fence structure is moving.

2. The system of claim 1 further comprising an actuator connectable to the handle, and a plate member, the actuator being mounted on the plate member, the plate member being rigidly secured to the carriage.

3. The system of claim 2 wherein the coupler has plural planar portions, and the plate member has a main planar portion oriented perpendicular to the planar portions of the coupler.

4. The system of claim 2, wherein the actuator includes a hydraulic or pneumatic cylinder for driving the handle between locked and unlocked positions.

5. A linear positioning system for guiding a rip fence structure on a table saw comprising a rail assembly, a carriage configured to move back and forth along the rail assembly, wherein the carriage includes an interlock device that prevents the fence structure from moving during operation of the saw, and a partially folded coupler sheet rigidly connecting the carriage to the fence structure, wherein the rail assembly includes a substantially circular-cylindrical housing containing a threaded rod, the carriage having complementing threads so the carriage moves along the rail assembly as the threaded rod rotates.

6. A linear positioning system for guiding a rip fence structure on a table saw comprising a rail assembly, a carriage configured to move back and forth alone the rail assembly, and a partially folded coupler sheet rigidly connecting the carriage to the fence structure, wherein the carriage has a first T-shaped groove for receiving one or more bolt members fastening the coupler to the carriage, and a second T-shaped groove for fastening an interlock actuator mounting structure.

7. A linear positioning system for guiding a rip fence structure on a table saw comprising a rail assembly, a carriage configured to shuttle along the rail assembly, a coupler connecting the carriage to the fence, an interlock actuator mounting plate connected to the carriage, and an interlock actuator supported by the mounting plate operable to prevent movement of the fence structure when the saw is running.

8. The system of claim 7, wherein the coupler assembly further comprises a partially folded coupler sheet.

9. The system of claim 7, wherein the carriage moves in a processing direction parallel to the direction of fence structure movement, the coupler assembly having plural planar portions oriented parallel to the processing direction.

10. The system of claim 7, wherein the coupler assembly has a top planar portion secured to a top side of the fence structure.

11. The system of claim 7, wherein the interlock actuator device engages a handle for manipulating an interlock that locks the fence structure into position during operation of the saw.

12. The system of claim 11, wherein the coupler assembly has an opening through which the handle extends.

13. The system of claim 12, wherein the opening is a slot.

14. The system of claim 11, wherein the handle extends from the fence structure.

15. The system of claim 7, wherein the actuator device is connectable to an interlock handle.

16. The system of claim 15, wherein the coupler has plural planar portions, and the plate member has a main planar portion oriented perpendicular to the planar portions of the coupler.

17. The system of claim 7, wherein the actuator device comprises a hydraulic or pneumatic cylinder for driving a locking handle between locked and unlocked positions.

18. The system of claim 7, wherein the rail assembly comprises a substantially cylindrical housing containing a threaded rod, the carriage having complementing threads so the carriage moves along the rail assembly as the threaded rod rotates.

19. The system of claim 7, wherein the carriage has a T-shaped groove for receiving one or more bolt members fastening the coupler to the carriage.

* * * * *